(12) United States Patent
Donnard et al.

(10) Patent No.: US 11,125,893 B2
(45) Date of Patent: Sep. 21, 2021

(54) ANALYZING METHOD USING A DETECTOR OF ALPHA PARTICLES

(71) Applicants: Orano Mining, Chatillon (FR); AI4R, Nantes (FR)

(72) Inventors: Jérôme Donnard, Nantes (FR); Samuel Duval, Nantes (FR); Tugdual Oger, Nantes (FR); Hugo Lefeuvre, Nantes (FR); Hervé Toubon, Les Essarts-le-Roi (FR); Michael Descostes, Paris (FR)

(73) Assignees: ORANO MINING, Chatillon (FR); AI4R, Nantes (FR)

( * ) Notice: Subject to any disclaimer, the term of this patent is extended or adjusted under 35 U.S.C. 154(b) by 0 days.

(21) Appl. No.: 16/956,788

(22) PCT Filed: Dec. 20, 2018

(86) PCT No.: PCT/EP2018/086405
§ 371 (c)(1),
(2) Date: Jun. 22, 2020

(87) PCT Pub. No.: WO2019/122244
PCT Pub. Date: Jun. 27, 2019

(65) Prior Publication Data
US 2020/0326432 A1 Oct. 15, 2020

(30) Foreign Application Priority Data
Dec. 22, 2017 (FR) ..................................... 17 62989

(51) Int. Cl.
*G01T 1/16* (2006.01)
*G01T 7/00* (2006.01)
(52) U.S. Cl.
CPC ............ *G01T 1/1606* (2013.01); *G01T 7/005* (2013.01)

(58) Field of Classification Search
CPC ......... G01T 1/2935; G01T 1/365; G01T 1/29; G01T 1/36; G01T 1/1606; G01T 7/005
See application file for complete search history.

(56) References Cited

U.S. PATENT DOCUMENTS 9,217,793 B2 * 12/2015 Zhou ....................... G01T 3/008
2004/0021088 A1 2/2004 Thers et al.
2008/0073544 A1 3/2008 Gros D'Aillon et al.

FOREIGN PATENT DOCUMENTS

| EP | 1343194 A1 | 9/2003 |
| WO | WO2006008419 A1 | 1/2006 |
| WO | WO2011039473 A1 | 4/2011 |

OTHER PUBLICATIONS

Corresponding Search Report PCT/EP2018/086405.
(Continued)

*Primary Examiner* — David P Porta
*Assistant Examiner* — Fani Boosalis
(74) *Attorney, Agent, or Firm* — Davidson, Davidson & Kappel, LLC (57) ABSTRACT

A method is for analyzing, using a detector of alpha particles, a sample comprising at least one radionuclide emitter of a plurality of alpha particles. The detector comprises a detection medium and a plurality of measurement cells suitable for measuring at least one incident signal generated by an interaction of the alpha particle with said detection medium. The detector is designed to provide an autoradiographic image of said sample. The method comprises a step for determining (E1) an initial energy of each alpha particle. The step comprises repeating three sub-steps: determining (D1) a position of a first interaction of an alpha particle with the detection medium, determining (D2) an energy deposited by the particle in the interior of the detector and determining (D3) the initial energy of the alpha particle. The (Continued)

method then comprises constructing an energy spectrum for one zone of the autoradiographic image.

14 Claims, 4 Drawing Sheets

(56) References Cited

OTHER PUBLICATIONS

Sardini Paul et al.: Quantitative Autoradiography of Alpha Particle Emission in Geo-Materials Using the Beaver ™ System, Nuclear Instruments & Methods in Physics Research. Section A, vol. 833, Jul. 4, 2016, pp. 15 to 22.

* cited by examiner

ANALYZING METHOD USING A DETECTOR OF ALPHA PARTICLES

The present invention relates to a method for analyzing, using a detector of alpha particles, a sample comprising at least one radionuclide emitter of a plurality of alpha particles.

BACKGROUND

Alpha particles or alpha rays are a form of radiation emitted by unstable cores with a high atomic mass. They are made up of two protons and two neutrons combined into a particle identical to the helium 4 core (helion). The alpha particles are emitted by radioactive cores (radionuclides), such as uranium or radium, during a process called "alpha decay". During this phenomenon, the radionuclide ejects an alpha particle and turns into a core with a lower mass number.

The analysis of the alpha radiation is for example used in the field of geology to characterize the presence of uranium 238 or thorium 232 and daughter elements thereof. Applications are also found in the medical field, and more generally in all fields in the sciences of living beings or the environment, for example to image animal or plant tissues, or to detect the presence of radionuclides such as polonium 210.

Alpha spectrometry is an analysis technique used to determine the nature of the alpha emitter radioelement with high precision. These measurements are for example done using a detector with silicon diodes or liquid scintillation counter. However, the performed measurements do not make it possible to obtain a spatial distribution of the activity of the radioelements present in the sample.

Autoradiography is another technique for analyzing a sample that makes it possible to characterize, for example using a phosphorus screen, the spatial distribution of alpha emitter radionuclides, but without making it possible to determine the nature of the radionuclides.

Thus, the characterization of the nature and spatial distribution of the radionuclides of a sample uses two separate analysis techniques and detectors of different natures. As a result, the characterization of the sample is time-consuming and tedious. Furthermore, the resolutions of the two methods are often different from one another, since they also depend on the nature of the detector used, which makes the joint integration and interpretation of these two types of measurements difficult.

SUMMARY

The present disclosure aims to address these drawbacks by proposing an analysis method using a detector of alpha particle that allows a simple and fast characterization of the nature and spatial distribution of the radionuclides present in a sample.

A method is provided for analyzing, using a detector of alpha particles, a sample comprising at least one radionuclide emitter of a plurality of alpha particles, the detector comprising a detection medium and a plurality of measurements cells adapted for measuring at least one incident signal generated by an interaction of an alpha particle with said detection medium, the detector being configured to deliver an autoradiographic image of said sample, the method comprising the following steps:

E1) determining an initial energy of each alpha particle, said determining step (E1) comprising repeating the following sub-steps for each alpha particle:
D1) determining a position of a first interaction of an alpha particle with the detection medium of the detector by using at least one measurement cell,
D2) determining an energy deposited by the particle in the interior of the detector by using the measured incident signal,
D3) determining, by using the deposited energy determined in sub-step (D2), the initial energy of the alpha particle before the first interaction of the alpha particle with the detection medium of the detector,
E2) for at least one zone of the autoradiographic image, constructing an energy spectrum using the determined initial energies of the corresponding alpha particles.

Thus, the method may make it possible to characterize the nature and the spatial distribution of the radionuclides of the sample by using a single detector, simply and quickly. In the context of the present disclosure, the detector can in particular be chosen from a gaseous detector, a semiconductor detector or a scintillator detector.

According to particular embodiments, the method according to the invention comprises one or more of the following features, considered alone or according to any technically possible combinations:
sub-step (D1) comprises at least one operation for amplifying (O1, O2) an interaction of the alpha particle with the detection medium of the detector using at least one electric field,
before step (E1), a calibration step (E0) of said initial energy of the alpha particle is carried out using a calibration source,
the detector of alpha particles is a gaseous detector and the incident signal is a moving charge,
the position of the first interaction of the alpha particle with the detection medium of the detector is determined from a distribution of a plurality of incident signals measured by the measurement cells,
sub-step (D2) comprises an operation for measuring (O4) charges generated successively along the path of the alpha particle inside the detector, and
an operation for measuring (O6) the length of the path traveled by the alpha particle inside the detector of alpha particles,
the initial energy of the alpha particle being determined by using the determined deposited energy and the length of the measured path,
the method comprises, before the operation for measuring (O6) the length of the path of the alpha particle, an operation for identifying (O5) alpha particles having passed all the way through the detector of alpha particles, with the understanding that only the alpha particles having passed all the way through the detector are considered in step (E2) for constructing energy spectrums,
the identification operation (O5) comprises a calculation of a geometric parameter of a distribution of the charges measured in the detector of alpha particles along a direction of the detector of alpha particles,
the geometric parameter is a flattening coefficient of the distribution of the measured charges,
the identification operation (O5) comprises the application of a threshold to the flattening coefficient of the distribution of the measured charges and the selection of the alpha particles having a flattening coefficient below said threshold, the initial energy of the alpha particle is determined by using the ratio between the energy deposited by the alpha particle and the length of the path traveled by said alpha particle, the initial energy of the alpha particle is determined by connecting said initial energy to the ratio between the energy deposited by the alpha particle and the length of the path traveled by said alpha particle by a relationship of the exponential type, the exponential-type relationship satisfies the formula:

$$E\left(\frac{E_{dep}}{d}\right) = a \times \left(\frac{E_{dep}}{d}\right)^b$$

$E_{dep}$ being the energy deposited by the alpha particle (3B) in question, d being the length of the path traveled by the alpha particle (3B), a and b being coefficients, the detector is a semi-conductor detector or a scintillator detector and the measured incident signal is respectively a moving charge or a photon.

BRIEF DESCRIPTION OF THE DRAWINGS

Other aspects and advantages of the invention will appear upon reading the following description, provided as an example and done in reference to the appended drawings, in which.

DETAILED DESCRIPTION

Figure 1:
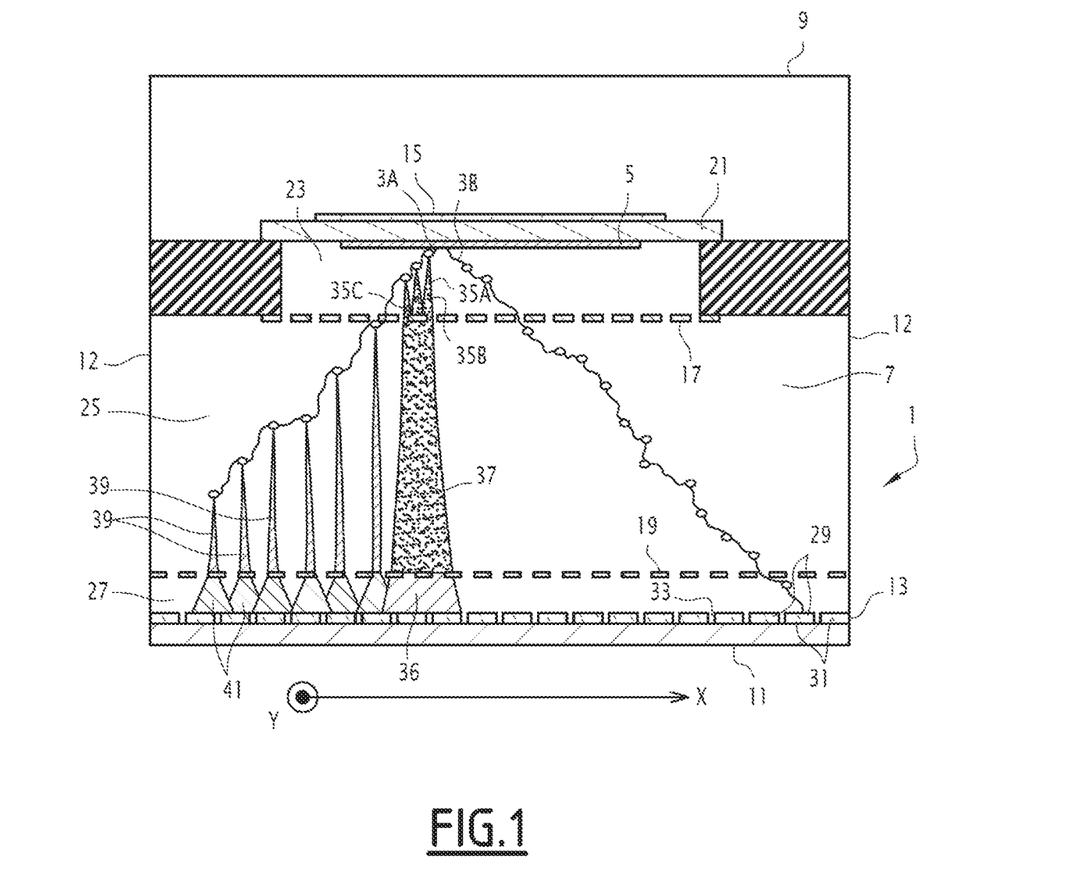
FIG. 1 is a schematic illustration of a gaseous detector used to carry out the method according to one embodiment.

The method according to the present disclosure relates to a method for analyzing, using a detector 1 of alpha particles 3A, 3B, a sample 5 comprising at least one radionuclide emitter of a plurality of alpha particles 3A, 3B (FIG. 1).

The detector 1 is designed to provide an autoradiographic image of the sample 5.

An autoradiographic image is an image of a spatial distribution of radionuclide alpha emitters within the sample 5.

According to one preferred embodiment, the detector 1 of alpha particles 3A, 3B is a gaseous detector as shown in FIG. 1.

The detector 1 is substantially similar to the gaseous detector described in document WO 2011/039473 A1. Hereinafter, only the features of the detector 1 that are necessary to understand the analysis method according to the present disclosure will be specified in reference to FIG. 1.

The detector 1 comprises an enclosure 7 defined by two main walls 9, 11 that are opposite and parallel to one another and side walls 12.

The main walls 9, 11 for example have a surface area of between 1 cm×1 cm and 30 cm×30 cm, for example 23 cm×23 cm.

The enclosure 7 contains a detection medium suitable for emitting primary electrons under the effect of the alpha radiation emitted by the sample 5.

The detection medium is typically made up of a gaseous mixture circulating in the enclosure 7 between an inlet and an outlet (not shown).

The gaseous mixture is for example a mixture between a rare gas, for example xenon, and a polyatomic gas, for example $CH_4$.

The gaseous mixture is advantageously at a pressure between 0.1 bars and 5 bars, for example 1 bar.

The enclosure 7 typically has a thickness between 0.5 cm and 20 cm, for example 1 cm.

The detector 1 comprises an anode 13, a cathode 15, a first electrode 17 and a second electrode 19.

Typically, the anode 13, the cathode 15, the first electrode 17 and the second electrode 19 are parallel to one another and parallel to the two main walls 9, 11 of the enclosure 7.

The cathode 15 is for example a conductive adhesive, for example a copper adhesive, adhered on one face of a glass slide 21, the sample 5 being arranged on an opposite face of the glass slide 21.

The cathode 15 and the first electrode 17 define a first amplification area 23 between them The first electrode 17 and the second electrode 19 define a drift area 25 between them.

The second electrode 19 and the anode 13 define a second amplification area 27 between them.

The amplification and drift phenomena are described in the remainder of the disclosure.

The first electrode 17 and the second electrode 19 are for example microgates of the MICROMEGAS type as disclosed in WO 2011/039473 A1.

Advantageously, polarization means (not shown) are connected to the cathode 15, the anode 13, the first electrode 17 and the second electrode 19. They make it possible to bring the cathode 15 to a potential $V_1$, the anode 13 to a potential $V_2$, the first electrode 17 to a potential $V_3$ and the second electrode 19 to a potential $V_4$.

Typically, these potentials verify the relationship $V_2 > V_4 > V_3 > V_1$.

The polarization means thus make it possible to create electric fields $E_1$, $E_2$, $E_3$ respectively in the first amplification area 23, the drift area 25 and the second amplification area 27.

The electric fields $E_1$ and $E_3$ in the first amplification area 23 and the second amplification area 27 are typically greater than 3 kV/cm.

The electric field $E_2$ in the drift area 25 is for example less than 3 kV/cm.

The potentials $V_1$, $V_2$, $V_3$ and $V_4$ are advantageously less than several kV, for example 3 kV.

The detector 1 comprises a plurality of measurement cells 29 suitable for measuring at least one incident signal generated by an interaction of the alpha particle 3A, 3B with the detection medium of the detector 1.

In the case of the gaseous detector 1 described above, the measurement cells 29 are formed by elementary anodes or blocks 31 of the anode 13.

The anode 13 is for example of the type described in document WO 2011/039473 A1.

The blocks 31 are typically separated from one another by spaces 33 and form a two-way checkerboard measuring network, the rows of which are aligned along axes with perpendicular coordinates X and Y.

Each block 31 for example forms a square of less than one millimeter per side, for example 650 µm. The blocks 31 are alternately assigned to reading one or the other of the coordinates X and Y. Two adjacent blocks 31 do not measure the same position along the same coordinates. The space 33 between the blocks 31 is as small as possible, while making it possible to isolate each block 31 from the adjacent block 31. For example, the space 33 is smaller than or equal to 100 µm.

The structure of each block 31 is for example similar to that described in document WO 2011/039473 A1.

The signal measured by the blocks 31 is typically an incident electronic charge.

The blocks 31 make it possible to convert an incident electronic charge into an electric current proportional to said charge.

The sample 5 can include a single type of radionuclide or a mixture of different radionuclides.

The radionuclides are typically of natural or artificial origin.

For example, the radionuclides are uranium 238 and/or thorium 232 and daughter elements thereof.

In a variant, the radionuclides are artificial actinides, such as plutonium, for example.

The sample 5 is for example a sample of rock, or plant, animal or human tissue.

The sample 5 is typically a thin layer having a thickness of between 5 µm and 100 µm, for example 20 µm.

The sample 5 for example has lateral dimensions that are advantageously smaller than the field of view of the detector 1, that is to say, the dimensions of the anode 13.

The field of view of the detector 1 corresponds to the solid angle through which the detector 1 is sensitive to the radiation of the alpha particles 3A, 3B.

The sample 5 is typically deposited on the glass slide 21, so as to keep the sample substantially parallel to the anode 13.

The glass slide 21 typically has a thickness of one millimeter.

In a variant, the sample 5 is deposited on a metal part.

Advantageously, the surface of the sample 5 is substantially smooth and substantially parallel to the electrode 17.

Advantageously, the preparation of the sample 5 comprises a step for metallization of the surface of the sample 5, for example with gold/palladium, making it possible to ensure a homogeneous polarization of the surface of the sample 5. This preparation is typically identical to that, commonly used, of samples for scanning electron microscopy.

An analysis method (FIG. 2) implemented using a gaseous detector 1 as described above will now be described in detail below.

In reference to FIG. 1, an alpha particle 3A, 3B is emitted by the sample 5 at the main face 9 of the enclosure 7 of the gaseous detector 1. The alpha particle 3A, 3B passes through the enclosure of the detector 1 and interacts with the gaseous medium while generating primary electrons that spread and multiply in the enclosure 7 of the detector 1 from the cathode 15 to the anode 13.

Figure 2:
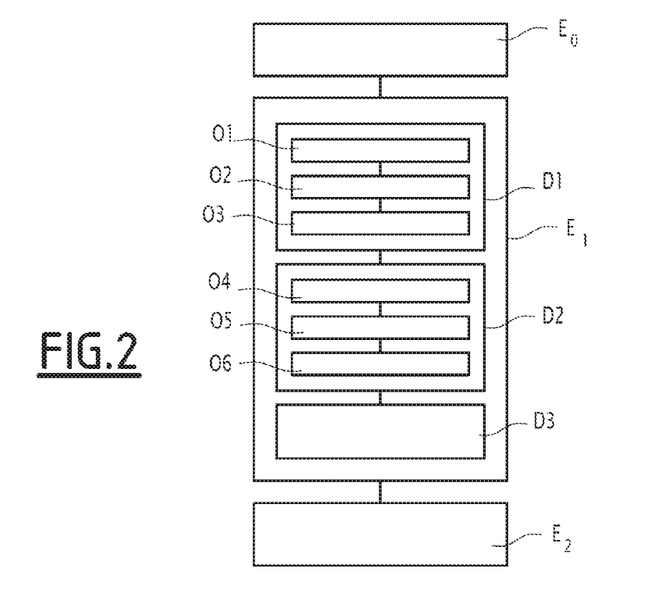
FIG. 2 is a diagram showing the different steps, sub-steps and operations of a method according to an embodiment of the invention.

The method comprises a step for determining E1 an initial energy of each emitted alpha particle 3A, 3B. The determining step E1 comprises repeating three sub-steps D1, D2 and D3, for each alpha particle 3A, 3B.

The first sub-step D1 comprises determining a position corresponding to a first interaction of an alpha particle 3A, 3B with the detection medium of the detector 1 of alpha particles 3A, 3B by using at least one measurement cell 29.

The first sub-step D1 makes it possible to locate the radionuclide in the sample 5 that is at the origin of the emission of the alpha particle 3A, 3B.

Advantageously, the first sub-step D1 comprises at least one operation for amplifying the interaction of the alpha particle 3A, 3B with the detector 1 of alpha particles 3A, 3B, using at least one electric field.

According to the preferred embodiment in which the detector 1 of alpha particles 3A, 3B is a gaseous detector, the first sub-step D1 comprises amplifying the interaction of the alpha particle 3A, 3B with the gas atoms present in the enclosure 7 of the detector 1.

Thus, in the preferred embodiment, the first sub-step D1 comprises a first amplification operation O1 in the first amplification space 23.

The electric field $E_1$ that prevails inside the first amplification area 23 accelerates the electrons created by the interaction between the alpha particle 3A, 3B and the gaseous medium. Each electron collides with a gas atom and ionizes it, with the release of a new electron. The two electrons again ionize two gas atoms that in turn release an electron each. Thus, by avalanche effect, more and more electrons are created between the cathode 15 and the first electrode 17.

Advantageously, the first amplification operation O1 is done as close as possible to the sample 5. This makes it possible to maximize the electronic avalanche effect and to obtain a significant electronic charge peak corresponding to the charges embodied by a trapezoid 36 in FIG. 1.

As shown in FIG. 1, the alpha particle 3A, 3B successively interacts with several gas atoms in the first amplification area 23. Each of these interactions is amplified by electronic avalanche effect and participates in the charge peak embodied by a trapezoid 36 in FIG. 1.

The electrons 35A, 35B and 35C generated by the electronic avalanche phenomenon in the first amplification area 23 next spread in the drift area 25. The drift area 25 makes it possible to transfer the electronic charges 39 and 37 to the anode 13.

Advantageously, the first sub-step D1 includes a second amplification operation O2 in the second amplification area 27 by electronic avalanche effect, similarly to what was described above.

Sub-step D1 then comprises an operation for determining O3 the mean position (X0, Y0), along the axis X and the axis Y of the anode 13, of the first interaction between the alpha particle 3A, 3B and the gaseous medium, using the blocks 31 of the anode 13.

The entry position of the alpha particle 3A, 3B into the amplification area 23 is typically determined by using the blocks 31, respectively allocated to the measurement along the axis X and along the axis Y, receiving the electronic charge at the outlet of the amplification area 27.

The position of the first interaction of the alpha particle 3A, 3B with the detection medium of the detector 1 is then advantageously determined from a distribution of the incident signals measured by the measurement cells 29.

In the example shown above, the mean position (X0, Y0) is determined from the distribution of the incident electronic charges measured by the blocks 31 of the anode 13.

The mean position thus determined then corresponds to the position within the sample 5 of the radionuclide at the origin of the emission of the alpha particle 3A, 3B.

The implementation of the sub-step D1 assumes that the path of the electrons created by the interaction between the alpha particle 3A, 3B and by the electronic avalanche phenomenon occurs in a straight line along the direction of the electric charges in the amplification 23, 27 and drift 25 areas, with no significant angle deviation.

After having passed through the first amplification area 23, the alpha particle 3A, 3B continues its journey in the drift area 25. The alpha particle 3A, 3B then successively interacts with atoms in the gaseous medium of the drift area and generates electrons 39 that spread in the drift area 25 up to the second amplification area 27, where the electronic charges 41 are amplified by electronic avalanche effect similarly to what was previously described, then detected by the blocks 31 of the anode 13.

The method comprises a sub-step for determining D2 the energy deposited by the alpha particle 3A, 3B inside the detector 1 of alpha particles 3A, 3B by using the measured incident signal.

Typically, the sub-step D2 comprises an operation O4 for measuring charges 41, 36 generated successively along a path of the alpha particle 3A, 3B inside the detector 1.

The electronic charges 41 and 36 are typically diffused in the drift area 25 and amplified in the two amplification areas 23 and 27.

These measurements are done using the blocks 31 of the anode.

Figure 3:
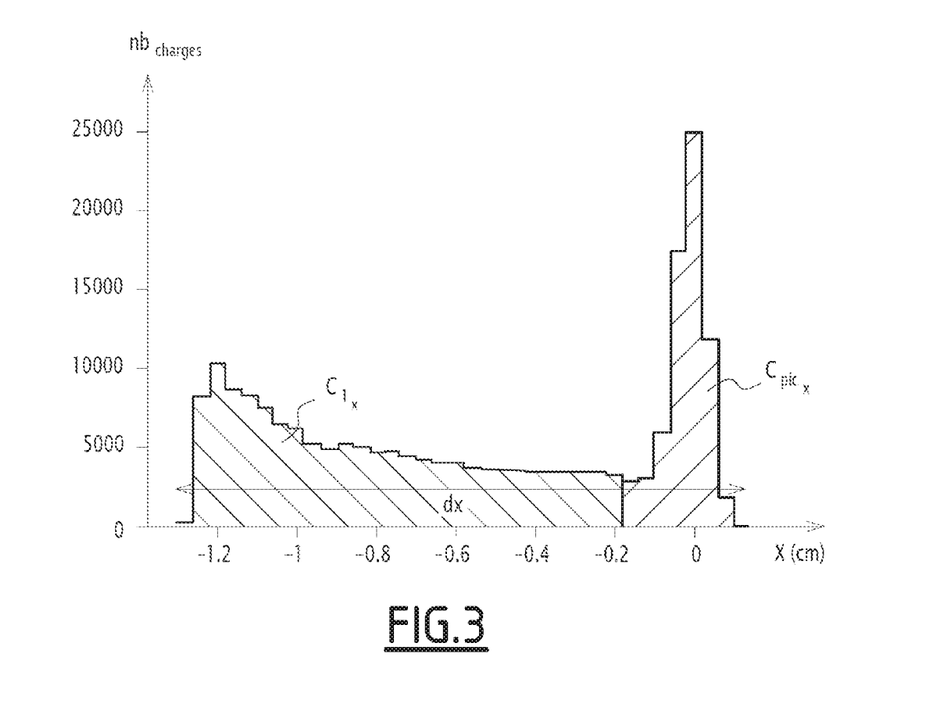
FIG. 3 is a graphic illustration of charges deposited by an alpha particle in the detector of FIG. 1 along the axis X of the anode of the detector.

FIG. 3 shows an exemplary distribution of electronic charges measured by the anode 13 along the axis X.

The position of the charge peak created in the first amplification area 23 of the detector 1, corresponding to the first interaction of the alpha particle 3A, 3B with the detection medium of the detector 1, is located at X=0.

The deposited energy is linked to the number of primary electrons by the relationship:

$$E_{dep} = W \times \text{primary}_{nb} \quad (1)$$

W is the mean ionization energy in the gas and primary$_{nb}$ is the number of primary electrons. The mean ionization energy depends on the gaseous mixture. The mean value typically selected for gaseous mixtures is 30 eV.

The toll charge $C_{total_i}$ measured along the axis i of the anode 13 is written:

$$C_{total_i} = n_1 a_1 a_2 e + n_2 a_2 e \quad (2)$$

$n_1$ is a number of primary charges generated in the first application area 23 by the interaction of the alpha particle 3A, 3B with the detection medium.

$n_2$ is a number of primary charges generated in the drift area 25 by the interaction of the alpha particle 3A, 3B with the detection medium.

$a_1$ is an amplification gain associated with the amplification area 23.

$a_2$ is an amplification gain associated with the amplification area 27.

e is the charge of an electron.

i=x or i=y, depending on whether the calculations are done with the charge distribution measured along the axis X or the axis Y of the anode 13.

In reference to FIG. 3, the charge associated with the first part of the charge distribution $C_{1_i}$ is written:

$$C_{1_i} = n_2 a_2 e \quad (3)$$

The charge associated with the second part of the charge distribution $C_{peak_i}$ corresponding to the charge measured at the peak due to the charges deposited in the first amplification area 23 having experienced the amplification of the first and second amplification area 23 and 27 is written:

$$C_{peak_i} = n_1 a_1 a_2 e \quad (4)$$

The charge $C_{extrapolation_i}$ deposited in the first amplification area 23 that would be measured if the gain $a_1$ in the first application area 23 was unitary, is written:

$$C_{extrapolation_i} = n_1 a_2 e \quad (5)$$

$C_{peak_i}$ can then be written:

$$C_{peak_i} = C_{extrapolation_i} a_1 \quad (6)$$

If $a_1 = 1$ (unitary gain), then $C_{peak_i}$ is written:

$$C_{peak_i} = C_{extrapolation_i} \quad (7)$$

$C_{total_i}$ can therefore be written in the form:

$$C_{total_i} = C_{peak_i} + C_{1_i} \quad (8)$$

By definition, the charge deposited by the alpha particle 3A, 3B in the detection medium $C_{dep_i}$ can be written in the form:

$$C_{dep_i} = n_1 e + n_2 e = \frac{(n_1 a_2 e + n_2 a_2 e)}{a_2} = \frac{(C_{extrapolation_i} + C_{1_i})}{a_2} \quad (9)$$

Therefore, one obtains:

$$C_{1_i} = a_2 C_{dep_i} - C_{extrapolation_i} \quad (10) \text{ and}$$

$$C_{total_i} = C_{peak_i} + C_{dep_i} a_2 - C_{extrapolation_i} \quad (11)$$

The deposited charge $C_{dep_i}$ is then written:

$$C_{dep_i} = (C_{total_i} + C_{extrapolation_i} - C_{peak_i}) / a_2 \quad (12)$$

The charges $C_{total_i}$ and $C_{peak_i}$ are typically calculated by adding the values of each corresponding vertical column of the charge distribution histogram as for example shown in FIG. 3.

The total charge deposited $C_{dep_{total}}$ by the alpha particle 3A, 3B is obtained by adding the charge deposited $C_{dep_x}$ along the axis X and the charge deposited $C_{dep_y}$ along the axis Y.

The total deposited charge $C_{dep_{total}}$ is also written:

$$C_{dep_{total}} = e \times \text{primary}_{nb} \quad (13)$$

The following equation is therefore deduced for the total energy deposited by the alpha particle 3A, 3B in the detection medium of the detector 1:

$$E_{dep_{total}} = \frac{C_{dep_{total}} \times W}{e} \quad (14)$$

Advantageously, the sub-step D2 comprises an operation for identifying O5 alpha particles 3B passing all the way through the detector 1 with alpha particles 3A, 3B.

Indeed, as shown in FIG. 1, the nature and the geometry of the detector 1 of alpha particles 3A, 3B induces two types of events: the alpha particle 3B passes all the way through the detector 1 or the alpha particle 3A is calorimetrized in the gas and stops inside the enclosure 7 of the detector 1.

Typically, the identification operation O5 comprises a calculation of a geometric parameter of the distribution of the energy deposited by the alpha particle 3A, 3B in the detector 1 of alpha particles 3A, 3B in a direction of the detector 1 of alpha particles 3A, 3B.

For example, the geometric parameter is a flattening coefficient of the distribution of the energy deposited along the axis X or the axis Y, also called kurtosis.

Indeed, an alpha particle 3B that passes through the detector 1 generates a distribution of charges along the axis X or Y of the anode 13, which is "flatter" than that of an alpha particle 3A that is stopped inside the enclosure 7 of the detector 1. This feature is related to the fact that the energy deposition by unit of length is greater at the end of travel in the gas.

Kurtosis corresponds to a measurement of the flattening coefficient of a function or distribution. The flatter the latter is, the lower the kurtosis value is.

Advantageously, the kurtosis is calculated over a range of measurements excluding the charge peak due to the charges amplified in the first amplification area 23. Indeed, the charges corresponding to the peak, for example in FIG. 3 around the position X=0, undergo two successive amplifications in the amplification areas 23 and 27. The kurtosis is thus calculated only for the charges that undergo only the amplification of the amplification area 27.

For example, in reference to FIG. 3, the kurtosis is calculated by taking account of the distribution of charges comprised between X=−1.3 cm and X=−0.15 cm, excluding the charge peak centered on X=0 cm.

Figure 4:
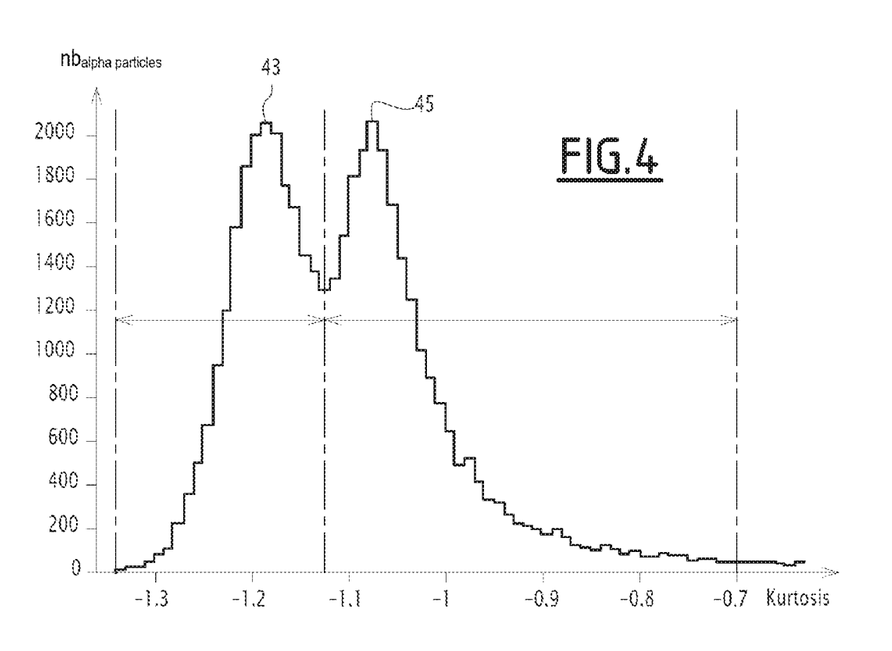
FIG. 4 is a graphic illustration of the distribution of the value of the kurtosis used to select the alpha particles having passed all the way through the detector.

FIG. 4 shows an exemplary distribution of the value of the kurtosis for a plurality of alpha particles emitted by the sample, the deposited energy of which is measured by the anode 13.

Two Gaussian trend distributions 43, 45 are visible.

The first distribution 43 centered on −1.2 corresponds to the alpha particles 3B that have passed all the way through the detector 1.

The second distribution 45 centered on −1.08 corresponds to the alpha particles 3A that have been calorimetrized inside the enclosure 7 of the detector 1.

As shown in FIG. 4, the two distributions 43, 45 are superimposed, and therefore for some alpha particles 3A, 3B, it is not possible, from the measurement of the kurtosis, to determine whether the particles 3A, 3B have passed through the detector 1 or whether they have been calorimetrized inside the detector 1.

Thus, typically, the operation to identify O5 alpha particles 3A, 3B comprises the application of a threshold on the value of the kurtosis and the selection of the alpha particles 3A, 3B whereof the kurtosis value is less than or equal to the threshold.

In the example of FIG. 4, the threshold is for example set at −1.12. Thus, only the alpha particles 3A, 3B having a kurtosis value less than or equal to −1.12 will be selected for the continuation of the method.

The sub-step D2 then typically comprises an operation for measuring O6 the length of the path traveled by the alpha particle 3B inside the detector 1 of alpha particles 3A, 3B, only the alpha particles 3B passing all the way through the detector 1 being considered during this operation.

Thus, for each of the charge distributions measured along the axis X and the axis Y of the anode 13, like for example the distribution shown in FIG. 3, the smallest coordinate $x_{min}$, $y_{min}$ and the largest coordinate $x_{max}$, $y_{max}$, for which at least one charge has been measured for the anode 13, are determined.

The distances traveled dx and dy, respectively along the axis X and the axis Y, are then calculated according to the relationships:

$$dx = x_{max} - x_{min} \text{ and } dy = y_{max} - y_{min} \tag{15}$$

The length of the path d is then calculated using the relationship:

$$d = \sqrt{dx^2 + dy^2 + dz^2} \tag{16}$$

The length dz corresponds to the thickness of the gas passed through. For the alpha particles 3B having passed all the way through the detector, this thickness is known because it depends directly on the dimensions of the detector 1.

For example, for the detector 1 described above, the thickness dz is equal to 1 cm.

The method then comprises a sub-step for determining D3, using the determined deposited energy, an initial energy of the alpha particle 3B before the first interaction of the alpha particle 3A, 3B with the detection medium of the detector 1 of alpha particles 3A, 3B.

In the preferred embodiment, the initial energy of the alpha particle 3B is determined by using the measured deposited energy and the length of the measured path.

Advantageously, the initial energy of the alpha particle 3B is determined by using a ratio between the energy deposited by the alpha particle 3B and the length of the path traveled by said alpha particle 3B.

The initial energy of the alpha particle 3B is for example determined by using a relationship of the exponential type.

The initial energy E of the alpha particle 3B is typically determined by using the following relationship:

$$E\left(\frac{E_{dep}}{d}\right) = a \times \left(\frac{E_{dep}}{d}\right)^b \tag{17}$$

$E_{dep}$ is the energy deposited by the considered alpha particle 3B.

d is the length of the path traveled by the alpha particle.

a and b are two coefficients.

Advantageously, the method comprises, before step E1, a step for calibrating E0 said initial energy of the alpha particle 3B by using a calibration source.

In the case where the initial energy of the alpha particle 3B is connected to the ratio between the energy deposited by the alpha particle 3B and the length of the path traveled by said alpha particle 3B according to relationship (17), the calibration step E0 makes it possible to determine the coefficients a and b.

The calibration is typically done for each acquisition, that is to say, before the analysis of each sample 5.

The calibration source typically contains at least two energy peaks $E_{cal1}$ and $E_{cal2}$ with different alpha radiation, for example between 4000 keV and 8000 keV.

"Different" means that the two energy peaks are separated by at least 1000 keV.

The calibration source is for example a radium 226 source.

Figure 6:
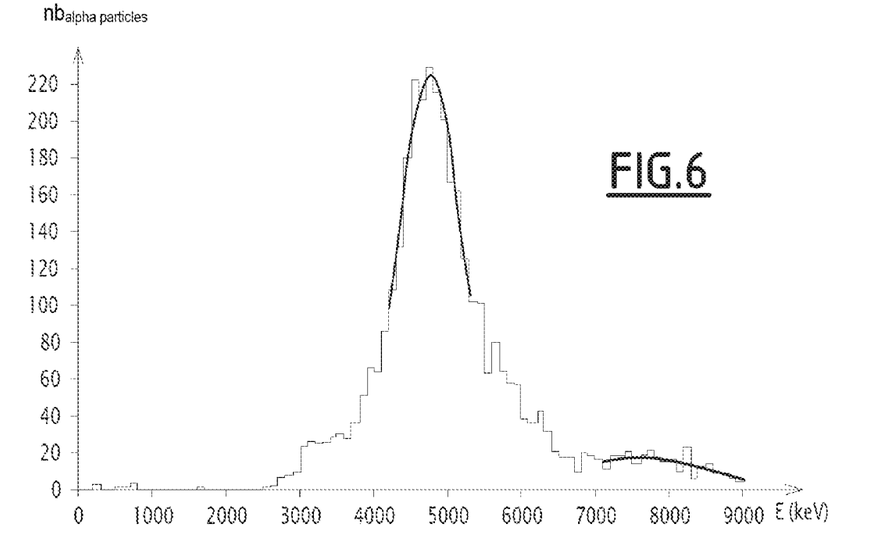
FIG. 6 is a graphic illustration of the energy spectrum of the calibration source using radium 226, after application of the calibration.

The energy spectrum of the calibration source using radium 226 comprises a first energy peak $E_{cal1}$ at 4800 keV (corresponding to the radium 226) and a second energy peak $E_{cal2}$ at 7700 keV (corresponding to polonium 214, daughter element of radium 226 in the decay chain).

In order to determine the coefficients a and b, the following system of equations should then be solved:

$$\begin{cases} a \times x_1^b = E_{cal1} = 4800 \text{ keV} \\ a \times x_2^b = E_{cal2} = 7700 \text{ keV} \end{cases} \quad (18)$$

$x_1$ and $x_2$ respectively correspond to the values of $$\frac{E_{dep}}{d}$$

associated with the energies $E_{cal1}$ and $E_{cal2}$.

Figure 5:
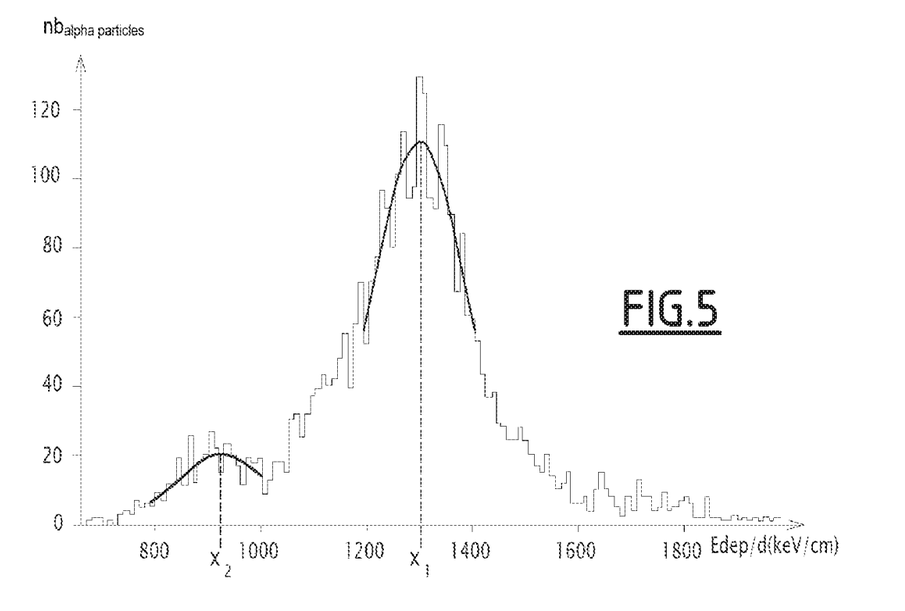
FIG. 5 is a graphic illustration of the distribution of the ratio of the energy deposited over the length of the path traveled by the alpha particle for a calibration source using radium 226.

FIG. 5 shows the distribution of $$\frac{E_{dep}}{d}$$

for the radium 226 calibration source measured with the detector 1.

The distribution has two separate peaks of $$\frac{E_{dep}}{d},$$

corresponding to the energy peaks at 4800 keV and 7700 keV of the radium 226 calibration source.

The Bethe formula and the Bragg curve for energy deposition of the alpha particles in the material, known by those skilled in the art, reflect the fact that the more the energy of the alpha particle increases, the lower the energy deposition per unit of length is. Thus, each of the two peaks of $$\frac{E_{dep}}{d}$$

can be associated with the corresponding energy peak.

The values $x_1$ and $x_2$ are determined after an adjustment of two Gaussian functions on the distribution.

In the example of FIG. 5, the values $x_1$ and $x_2$ respectively correspond to the values of $$\frac{E_{dep}}{d}$$

associated with the energies $E_{cal1}$ and $E_{cal2}$ are $x_1$=1295 keV/cm and $x_2$=912 keV/cm.

These values then make it possible to determine the coefficients a and b, which are equal in the considered example to a=7.51.10$^7$ and b=−1.34 by solving the system of equations set out above.

FIG. 6 shows the energy spectrum of the calibration source of radium after application of the calibration coefficients. The energy peaks are then centered on $E_{cal1}$=4800 keV and $E_{cal2}$=7700 keV.

The method then comprises, for at least one zone of the autoradiographic image, a step for construction E2 of an energy spectrum by using the determined initial energies of the corresponding alpha particles 3B.

Figure 7:
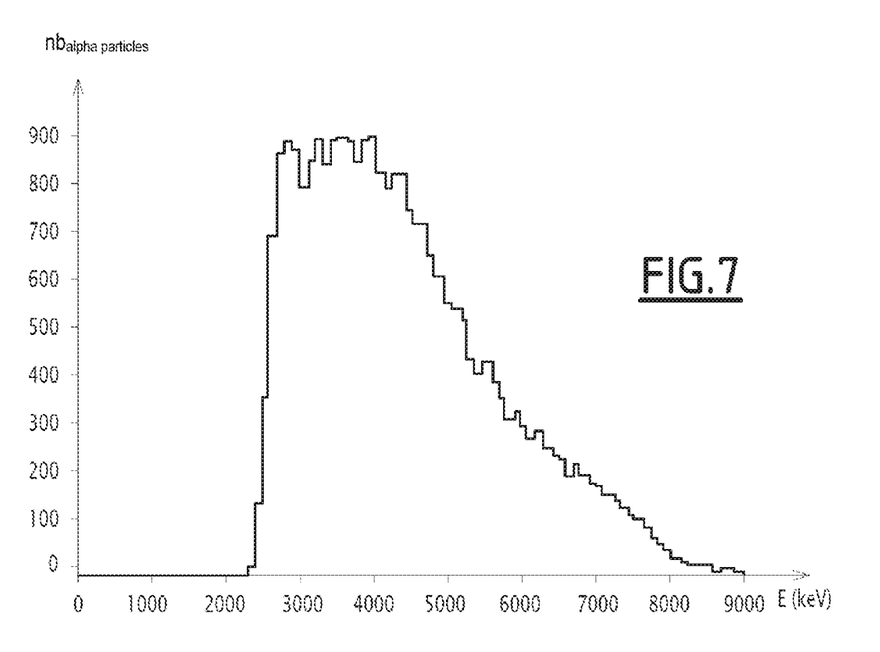
FIG. 7 is a graphic illustration of an energy spectrum obtained using the method according to an embodiment of the invention.

The energy spectrum represents the distribution of the initial energies of the sets of alpha particles 3B determined during step E1 of the method.

For each detected alpha particle 3B, a mean position X0$_i$, Y0$_i$ belonging to the field of view of the detector 1 and an associated initial energy E are determined, using the method previously described.

Typically, the method comprises, for a series of K alpha particles 3B detected during an acquisition, storage in matrix form of the mean positions X0$_i$, Y0$_i$ and associated initial energies E$_i$.

The zone of the autoradiographic image for which the energy spectrum is constructed during step E2 is typically a portion of the field of view of the detector 1, commonly called area of interest.

The construction of the spectrum is then done by using a subset of K alpha particles 3B for which the respective mean positions X0$_i$, Y0$_i$ are comprised in the area of interest.

The area of interest is typically a two-dimensional surface of non-nil surface area belonging to the anode 13, in the case of the gaseous detector 1 previously described.

The area of interest typically has any shape, for example circular or ellipsoid.

Advantageously, the construction step E2 is made for any zone belonging to the field of view of the detector 1.

In a variant, the detector 1 is a semiconductor detector.

The detection medium is henceforth a monolithic semiconductor or a semiconductor made up of several bricks arranged in matrices.

The sample 5 and the detection medium are typically separated by an empty space that is advantageously as fine as possible to favor the spatial location of the emission point while reducing the parallax effect. As a result, the alpha particles 3A, 3B emitted by the sample lose very little energy before interacting with the detector and all of the energy of the alpha particles is deposited in the semiconductor medium. The signals are measured on the blocks 31. The location of their emission point is possible simultaneously.

All of the alpha particles 3A, 3B interact with the detector 1. Thus, no selection operation of the alpha particles is required.

The incident signal measured by the blocks 31 is a moving electronic charge.

By polarization of the semiconductor medium, an electric current proportional to the energy deposited by the incident alpha particle is induced on the blocks 31.

Also in a variant, the detector is a scintillator in solid, liquid or gaseous form.

The sample 5 is ideally placed in contact with the scintillator detector. The alpha particle emitted by the sample 5 deposits its energy in the scintillating medium (gas, liquid, solid). Scintillation photons are then emitted.

The measurement cells 29 typically comprise photodetectors, for example SiPM photodetectors.

The incident signal measured by the measurement cells 29 comprises at least one photon.

The photodetectors are suitable for converting the photons emitted by the interaction between the alpha particle 3A, 3B and the scintillating medium into an electric current.

Thus, owing to the method according to the present disclosure, it is possible both to map the surface of the sample 5 and to identify, from the constructed energy spectrums, the nature of the alpha emitter radioelement and its position within the sample.

What is claimed is:

1. A method for analyzing, using a detector of alpha particles, a sample comprising at least one radionuclide emitter of a plurality of alpha particles, the detector comprising a detection medium and a plurality of measurements cells configured for measuring at least one incident signal generated by an interaction of an alpha particle with the detection medium, the detector being configured to deliver an autoradiographic image of the sample, the method comprising the following steps:

determining an initial energy of each alpha particle, the determining of the initial energy comprising repeating the following sub-steps for each alpha particle:

determining a position of a first interaction of an alpha particle with the detection medium of the detector by using at least one measurement cell, determining an energy deposited by the particle in the interior of the detector by using the measured incident signal, and determining, by using the determined energy deposited by the particle, the initial energy of the alpha particle before the first interaction of the alpha particle with the detection medium of the detector; and for at least one zone of the autoradiographic image, constructing an energy spectrum using the determined initial energies of the corresponding alpha particles.

2. The method according to claim 1, wherein the determining of the position of the first interaction comprises at least one operation for amplifying an interaction of the alpha particle with the detection medium of the detector using at least one electric field.

3. The method according to claim 1, further comprising, before the determining of the initial energy of each alpha particle, calibrating the initial energy of the alpha particle using a calibration source.

4. The method according to claim 1, wherein the detector of alpha particles is a gaseous detector and the incident signal is a moving charge.

5. The method according to claim 4, wherein the position of the first interaction of the alpha particle with the detection medium of the detector is determined from a distribution of a plurality of incident signals measured by the measurement cells.

6. The method according to claim 4, wherein the determining of the energy deposited by the particle comprises:

an operation for measuring charges generated successively along the path of the alpha particle inside the detector, and an operation for measuring the length of the path traveled by the alpha particle inside the detector of alpha particles, the initial energy of the alpha particle being determined by using the determined deposited energy and the length of the measured path.

7. The method according to claim 6 further comprising, before the operation for measuring the length of the path of the alpha particle, an operation for identifying alpha particles having passed all the way through the detector of alpha particles, with an understanding that only the alpha particles having passed all the way through the detector are considered in the second step for constructing energy spectrums.

8. The method according to claim 7, wherein the operation for identifying comprises a calculation of a geometric parameter of a distribution of the charges measured in the detector of alpha particles along a direction of the detector of alpha particles.

9. The method according to claim 8, wherein the geometric parameter is a flattening coefficient of the distribution of the measured charges.

10. The method according to claim 9, wherein the operation for identifying comprises applying a threshold to the flattening coefficient of the distribution of the measured charges and selecting the alpha particles having the flattening coefficient below the threshold.

11. The method according to claim 6, wherein the initial energy of the alpha particle is determined by using the ratio between the energy deposited by the alpha particle and the length of the path traveled by the alpha particle.

12. The method according to claim 11, wherein the initial energy of the alpha particle is determined by connecting the initial energy to the ratio between the energy deposited by the alpha particle and the length of the path traveled by the alpha particle by a relationship of the exponential type.

13. The method according to claim 12, wherein the relationship of the exponential type satisfies the formula:

$$E\left(\frac{E_{dep}}{d}\right) = a \times \left(\frac{E_{dep}}{d}\right)^b$$

$E_{dep}$ being the energy deposited by the alpha particle in question, d being the length of the path traveled by the alpha particle, a and b being coefficients.

14. The method according to claim 1, wherein the detector is a semi-conductor detector or a scintillator detector and the measured incident signal is respectively a moving charge or a photon.

* * * * *